Jan. 30, 1968   E. R. SMAGULA   3,365,741
AUTOMATIC SHOE-POLISHING AND-BUFFING APPARATUS AND MEANS
Filed Aug. 2, 1965   7 Sheets-Sheet 1

INVENTOR.
EMIL R. SMAGULA
BY
ATTORNEY

Jan. 30, 1968   E. R. SMAGULA   3,365,741
AUTOMATIC SHOE-POLISHING AND-BUFFING APPARATUS AND MEANS
Filed Aug. 2, 1965   7 Sheets-Sheet 5

INVENTOR.
EMIL R. SMAGULA
BY
ATTORNEY

Jan. 30, 1968   E. R. SMAGULA   3,365,741
AUTOMATIC SHOE-POLISHING AND-BUFFING APPARATUS AND MEANS
Filed Aug. 2, 1965   7 Sheets-Sheet 4
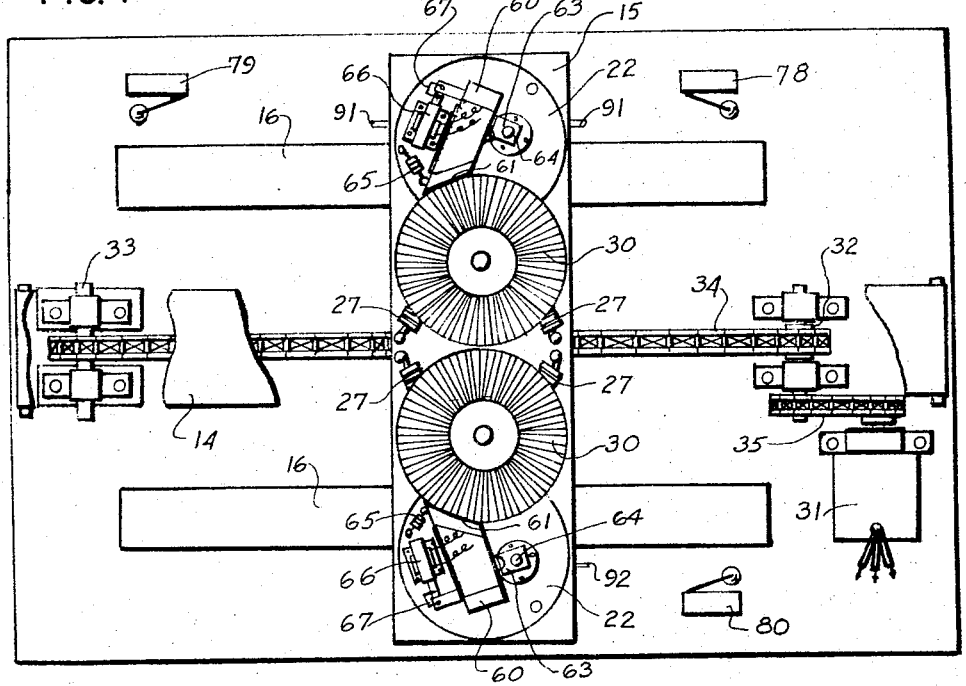
INVENTOR.
EMIL R. SMAGULA
BY
ATTORNEY

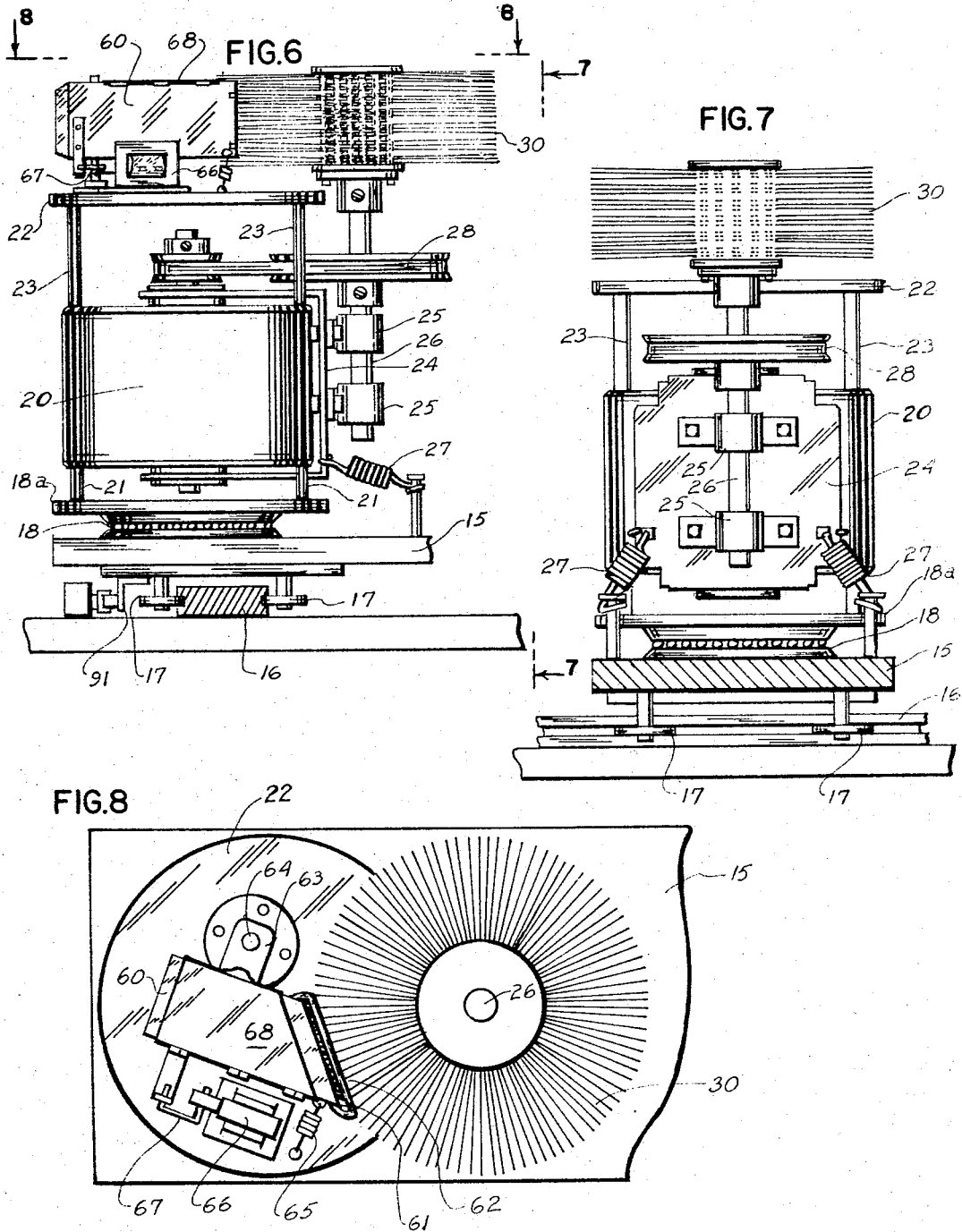

United States Patent Office
3,365,741
Patented Jan. 30, 1968

3,365,741
AUTOMATIC SHOE-POLISHING AND -BUFFING APPARATUS AND MEANS
Emil R. Smagula, 41 Woodland Way,
Manhasset, N.Y. 11030
Filed Aug. 2, 1965, Ser. No. 476,478
4 Claims (Cl. 15—31)

ABSTRACT OF THE DISCLOSURE

This invention relates essentially to an automatic shoe shine device comprising a support for the placement of a shoe, brushes mounted strategically with respect to the shoe and means for simultaneous rotation and reciprocatory movement of the brushes for engagement with respective surfaces of a shoe.

This invention relates generally to automatic shoe-polishing and -buffing apparatus.

It is an important object of the present invention to provide a shoeshine, or shoe-polishing and buffing device which is completely automatic in operation, the operation adapted for initiation by deposit of a coin, to effect shining of a shoe on a wearer's foot, without any effort by the wearer.

It is a further object of the present invention to provide an automatic shoe-polishing and -buffing device wherein the wearer may retain the shoe in a fixed position, which requires no movement of the shoe, operation of handles, or other skill or exertion.

The invention further contemplates the provision of an automatic visual display, say of slides, or the like, for convenient viewing by a person having his shoes shined, which display is entirely automatic in operation.

A more particular object of the present invention resides in the provision of a unique mechanism for thoroughly and effectively polishing and buffing shoes of widely varying sizes and shapes, all completely automatically and without adjustment or effort on the part of the user.

The invention further contemplates the provision of a unique means for dispensing shoe-polishing material to polishing brushes in a neat, efficient and economical manner.

It is still a further object of the present invention to provide an automatic shoe-polishing and -buffing apparatus having the advantageous characteristics mentioned in the preceding paragraphs, which is extremely simple in construction, durable and reliable throughout a long useful life, foolproof in operation, and which may be economically manufactured, installed and maintained.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
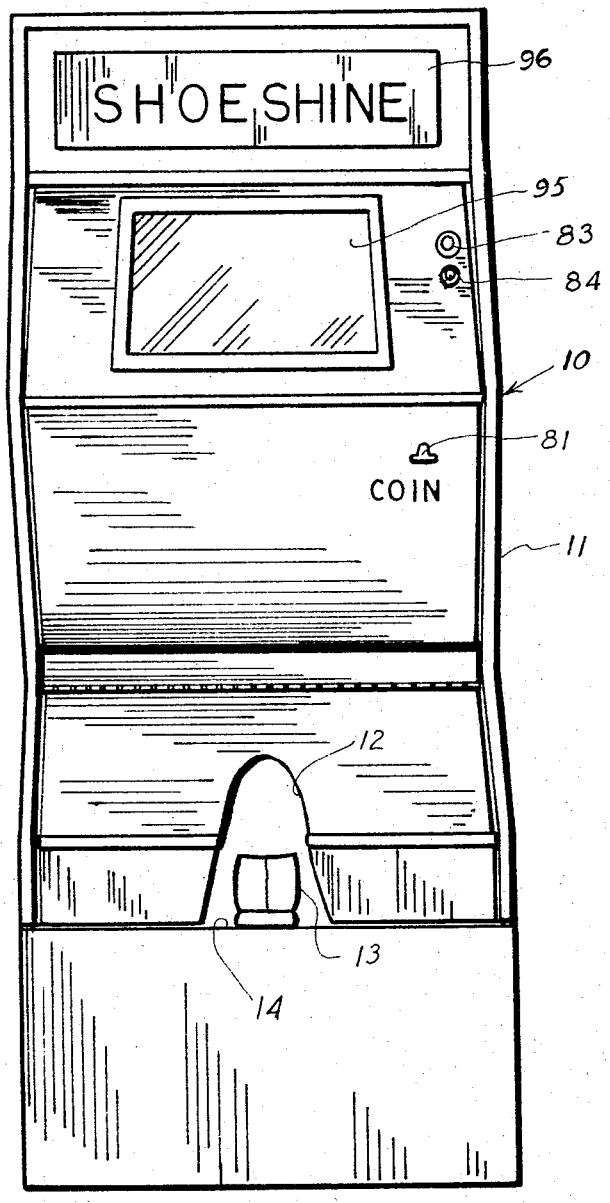
Figure 2:
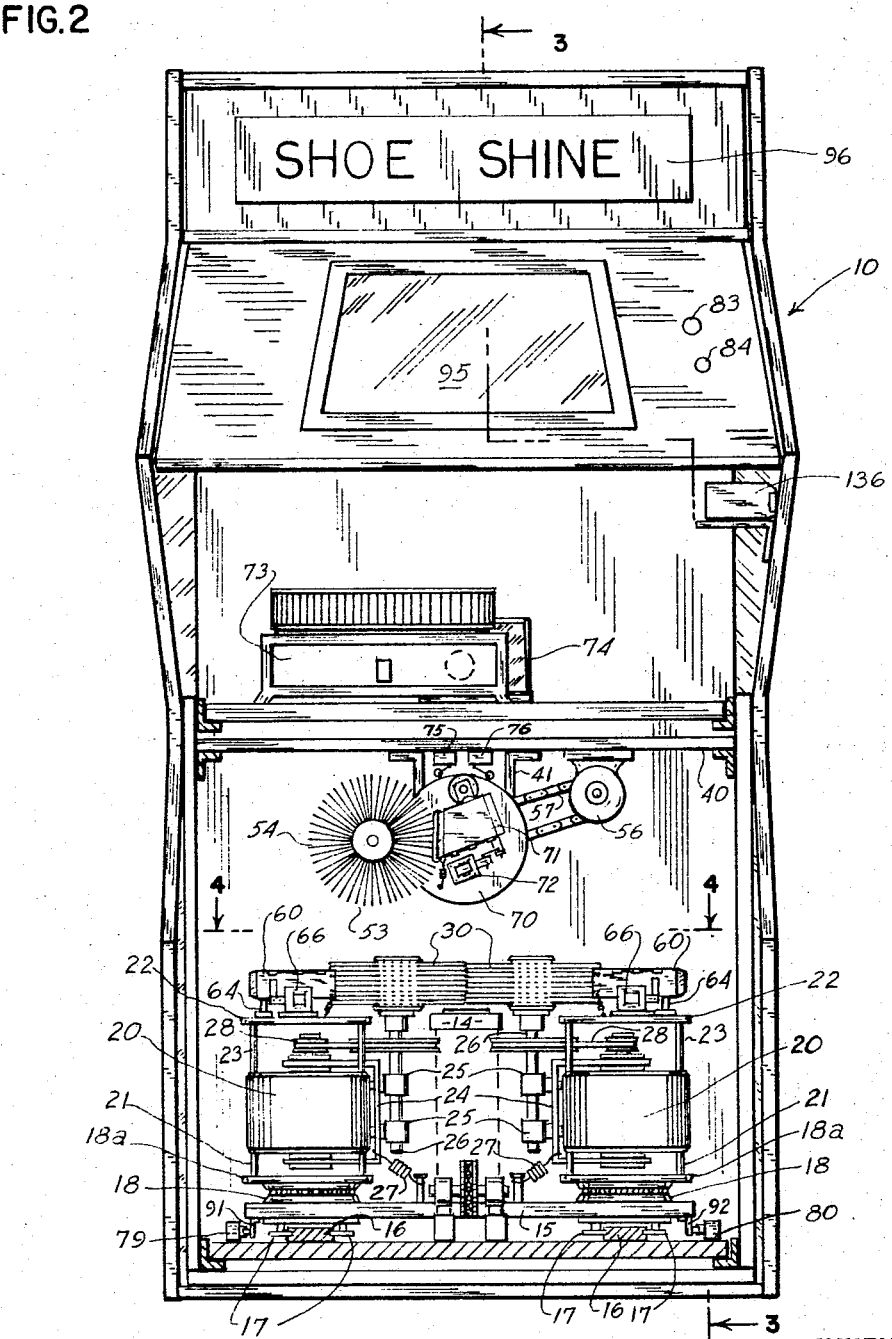
Figure 3:
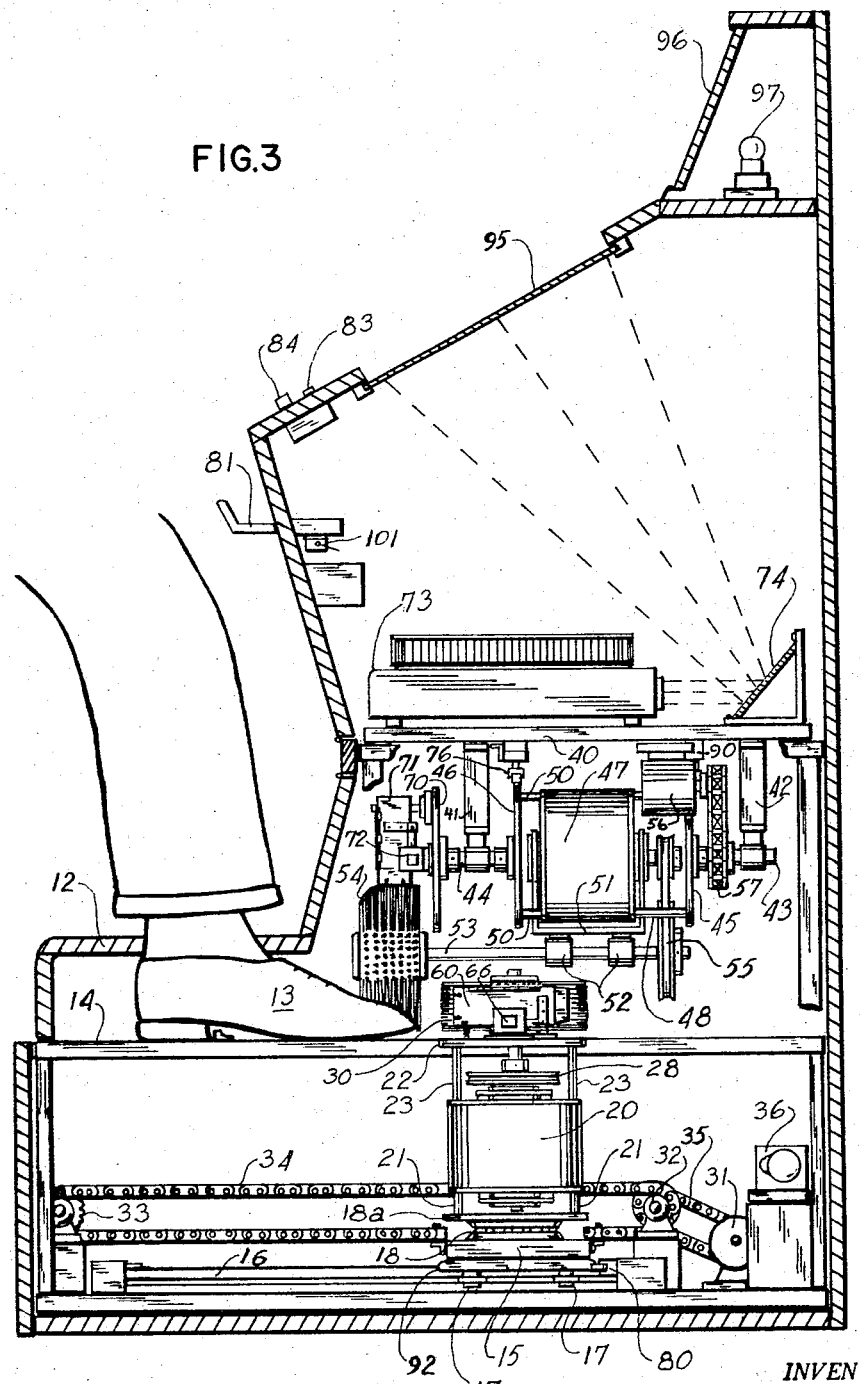
Figure 9:
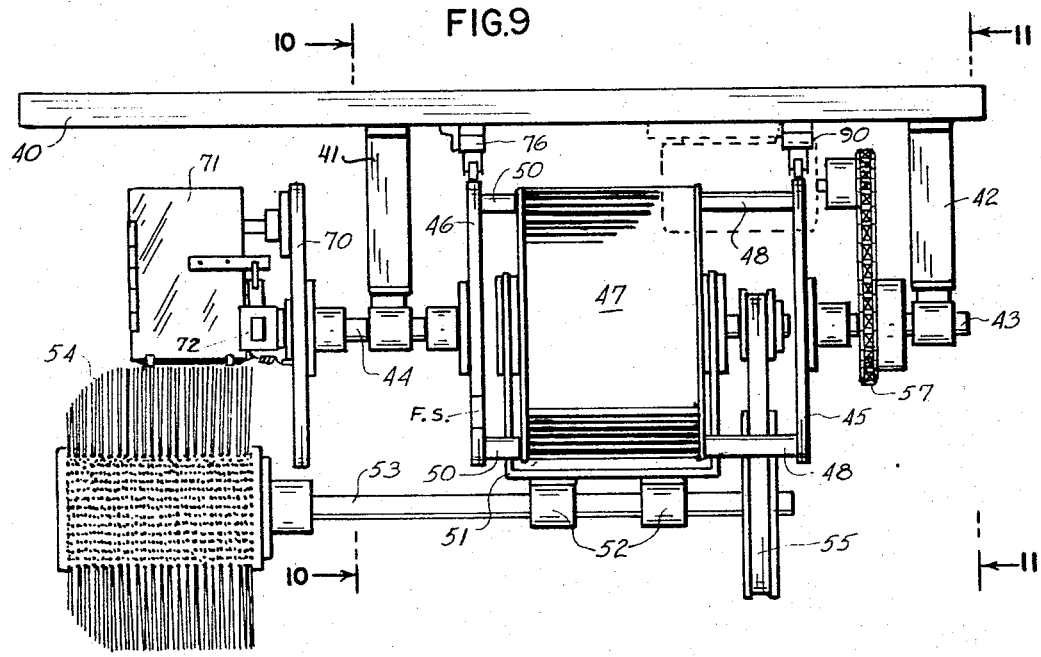
Figure 10:
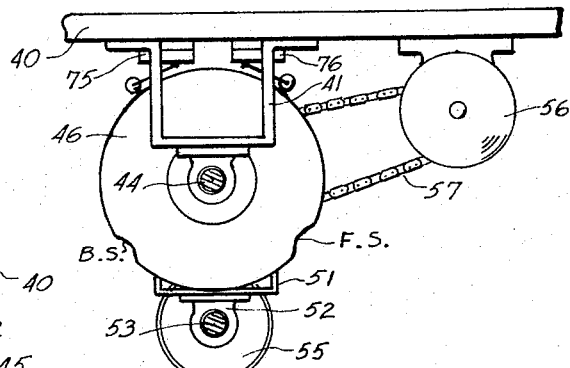
Figure 11:
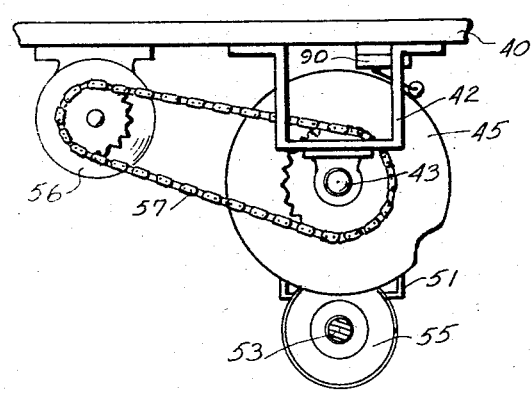
Figure 12:
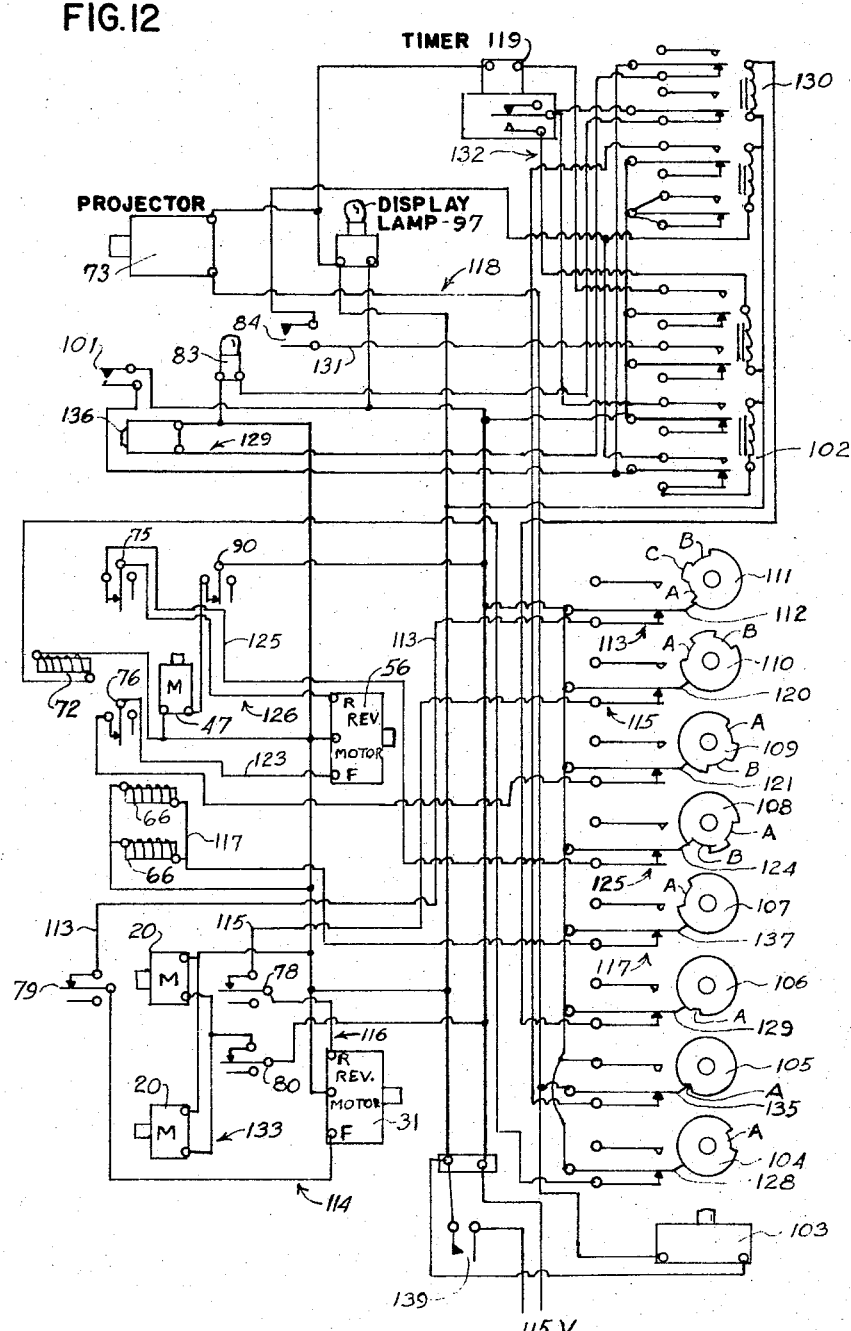

In the drawings:
FIGURE 1 is a front elevational view showing a shoeshine apparatus constructed in accordance with the teachings of the present invention;
FIGURE 2 is a front elevational view similar to FIGURE 1, but with parts broken away to illustrate the interior mechanism;
FIGURE 3 is a side sectional elevational view taken generally along the line 3—3 of FIGURE 2;
FIGURE 4 is a horizontal plan view taken generally along the line 4—4 of FIGURE 2;
FIGURE 5 is a horizontal plan view similar to FIGURE 4, showing an operative condition of use;
FIGURE 6 is a partial front elevational view similar to FIGURE 2, enlarged to illustrate greater detail;
FIGURE 7 is an elevational view taken generally along the line 7—7 of FIGURE 6;
FIGURE 8 is a plan view taken generally along the line 8—8 of FIGURE 6;
FIGURE 9 is an enlarged side elevational view of the top brush unit shown in FIGURE 3;
FIGURE 10 is a front elevational view taken along lines 10—10 of FIGURE 9;
FIGURE 11 is a rear elevational view taken along lines 11—11 of FIGURE 9; and
FIGURE 12 is a schematic of the electrical system.

Referring now more particularly to the drawings, and specifically to FIGURES 1-3 thereof, a shoeshine device is there generally designated 10, and may include a substantially closed cabinet 11 having a front-wall opening 12 for the insertion therethrough of a shoe 13. A platform or support 14 is located in the cabinet 11, providing a footrest for a shoe inserted in the opening 12. The footrest or support 14 may extend forwardly and rearwardly in the cabinet.

In a lower region of the cabinet 11, below the support 14, there is provided a laterally extending carriage 15 mounted for reciprocatory or back-and forth movement forwardly and rearwardly, as on a pair of forwardly and rearwardly extending, laterally spaced tracks 16 by means of wheels 17 on the underside of the carriage and rollably engaged in the adjacent track.

On the upper surface of carriage 15, adjacent to opposite ends thereof, there are provided a pair of rotary supports or thrust bearings 18. The thrust bearings 18 are each movable forwardly and rearwardly with the carriage 15 and independently rotatable about respective vertical axes on opposite sides of the foot support 14. A vertically disposed motor or drive means 20 is arranged in spaced relation generally axially on a disc or plate 18a, mounted over each thrust bearing 18, being mounted thereon by upstanding spacer studs 21. Spaced above each motor 20, generally concentric therewith, is a generally horizontal disc or plate 22 being fixed to the respective motor as by vertical spacer studs 23.

Each motor 20 is provided with a conventional motor carriage 24, say of U-shaped configuration extending between opposite ends of the respective motor and substantially fixed relative to the motor housing. Each motor carriage 24 may be provided with a pair of vertically aligned journal bearings 25 rotatably receiving an upstanding shaft 26. Thus, each shaft 26 is axially rotatable about its generally vertical axis, and swingable with its adjacent motor carriage 24 about the generally vertical axis of the respective motor 20. Resilient means, such as tension springs 27 may be connected between each motor carriage 24 and the reciprocatory carriage 15 to yieldably retain the housing of each motor 20 in a predetermined position of its axial rotation on respective bearing 18, while permitting of resilient rotation of the respective motor housing in opposite directions out of its predetermined position.

A belt-and-pulley connection 28 may be provided between the shaft of each motor 20 and the adjacent upstanding shaft 26 for effecting axial rotation of the latter upon energization of the associated motor. The shafts 26 upstand on opposite sides of the foot support 14 and are provided on their upper ends with generally cylindrical brushes 30 axially rotatable with respective shafts. In addition, the brushes 30 are mounted for reciprocatory movement forwardly and rearwardly with the carriage 15, and are also swingable about the vertical axes of respective motors 20 so as to move laterally toward and away from each other and the foot support 14.

In the lower rearward region of the cabinet 11 there is mounted a reversible motor 31 and an adjacent upstanding sprocket wheel 32. A similar upstanding sprocket wheel 33 is mounted in the lower forward region of the housing 11, and chain means 34 is trained about the wheels 32 and 33 and connected to the carriage 15. An additional chain 35 is connected in driving relation between the reversible motor 31 and the shaft of sprocket wheel 32, whereby rotation of the motor 31 in opposite directions effects back-and-forth movement of the carriage 15. In addition, a timing mechanism 36, comprising cams and relays as hereinafter described and shown in FIGURE 12, is provided for effecting reversal of the motor 31 in predetermined timed relation.

Spaced over the shoe support 14, the cabinet is provided with a generally horizontal, forwardly and rearwardly extending frame member 40. A pair of forwardly and rearwardly aligned, depending journal bearings or shaft hangers 41 and 42 are fixed to the underside of frame member 40. A rearward shaft 43 is carried by the rearward hanger 42, and a forward shaft 44 is carried by the forward hanger 41, the shafts 43 and 44 being in substantial alignment with each other. A generally vertical plate 45 has its central portion fixed to the forward end of shaft 43, and a similar, generally vertical plate 46 may have its central portion fixed to the rearward end of forward shaft 44. A motor 47 is interposed in spaced relation between the rearward and forward plates 45 and 46, the motor being in substantial alignment with the shafts 43 and 44, and having its housing fixed to the rear plate 45 by spacer studs 48 and fixed to the forward plate 46 by spacer studs 50. In this way the housing of motor 47 is mounted for generally axial rotation about the forwardly and rearwardly extending aligned axes of shafts 43 and 44.

A generally U-shaped motor carriage 51 may be carried by the housing of motor 47 and provided with a pair of forwardly and rearwardly aligned journal bearings 52. A generally horizontal, forwardly and rearwardly extending shaft 53 is carried by the bearings 52 and provided on its forward end with a generally cylindrical, rotary brush 54. Connected to the rearward end of shaft 53 is a transmission or pulley mechanism 55 driven by the shaft of motor 47. The brush 54 and its shaft 53 are thus rotatable about the axis of the shaft upon energization of the motor 47.

Furthermore, the housing of motor 47 is rotatable about the aligned axes of shafts 43 and 44. This rotation is effected by a drive motor 56 connected by a chain drive 57 to the shaft 43. The drive motor 56 is reversible for effecting a swinging or arcuate oscillatory movement of the housing of motor 47, together with shaft 53 and brush 54 laterally of the foot support 14 about the axis of shafts 43 and 44.

Mounted on the upper side of each upper plate 22, adjacent to a respective brush 30, is a polishing-material dispenser 60. The dispensers 60 may each include an elongated housing, best seen in FIGURE 8, having one end 61 open adjacent to and facing toward the associated brush 30. The housing of dispenser 60 may have its open end cut obliquely to face radially inward toward the adjacent brush 30 and is advantageously provided with a perforate or reticulate cover 62 across the open end. The dispenser housing 60 is carried by an arm 63 mounted on a pivot 64 upstanding from the upper surface of upper plate 22 eccentrically thereof to mount the housing for swinging movement of its open end 61 toward and away from the periphery of brush 30. Resilient means, such as a tension spring 65 may be connected between the housing of each dispenser 60 and the associated plate 22 to urge the dispenser housing 60 out of its dispensing engagement with the adjacent brush 30. Further, a latch relay 66 may be mounted on each plate 22 and connected by a suitable linkage 67 to the housing of the adjacent dispenser for urging the latter toward its dispensing engagement with the adjacent brush 30 against the action of spring 65. A hinged cover 68 is provided in the dispenser 60 for easy insertion of polishing material.

The forward end of forward shaft 44 may be provided with a generally vertical plate 70, and a dispenser 71, similar to the dispenser 60, may be mounted on the plate 70 in dispensing relation with respect to brush 54. The polishing-material dispenser 71 may be resiliently held out of dispensing relation with respect to brush 54, and a suitable latch relay 72 may be provided to move the dispenser 71 into dispensing relation with its associated brush.

On the upper side of the frame member 40 may be mounted a slide projector 73 arranged to project against a reflector 74, which reflects to a display screen 95 in an upper front-wall region of the cabinet 11. An advertising-copy space or sign 96 may be provided in an uppermost front-wall region of the cabinet 11, and may be illuminated by a lamp 97.

Associated with the carriage 15, say mounted on the lower or bottom wall of the cabinet 11, may be a pair of limit switches 78 and 79 respectively engageable upon movement of the carriage 15 to its rearmost and forwardmost positions. An additional limit switch 80 for turning the motor 20 "on" and "off," may also be provided in a lower region of the cabinet 11 for actuation by the carriage 15 upon movement to a rearmost position. The switches are best seen in FIGURE 5, wherein it will be apparent that the brushes 30 are rotated in opposite directions, the upper brush, as seen in FIGURE 5, rotating counterclockwise, and the lower brush there rotating clockwise.

A coin-receiving slot 81 is mounted in the front wall of cabinet 11 and adapted to close an electric switch upon acceptance of a coin. By suitable electrical connections, shown in detail in FIGURE 12, insertion of a coin in coin receiver 81 closes an electrical switch 101 which actuates the timing mechanism 36 to effect rotation of motor 31 and cause forward movement of carriage 15. The coin-operated switch 101 also initiates actuation of the slide projector 73 by electrical devices. As the carriage 15 moves forward away from limit switch 80, the latter is actuated to energize the motors 20 and rotate brushes 30 in the directions illustrated in FIGURE 5. By this simultaneous forward movement of brushes 30 and rotation, as illustrated, the brushes provide a highly effective polishing and buffing action and further upon coming into contact with a shoe cause their own lateral displacement away from each other by swinging of the motor carriages 24 against the action of springs 27 to conformably accommodate to the contour of a shoe 13. That is, the brushes 30, simultaneously with their axial rotation, are caused to swing outward away from and inward toward each other, independently of each other and in conformance with the contour of a shoe being polished.

In this manner the carriage 15 is caused to move forwardly and rearwardly through a predetermined number of cycles, as effected by the timing mechanism 36, which also serves to energize the solenoids or relays 66 in a predetermined timed relation to properly apply polishing material to the brushes. At selected intervals the polishing-material dispenser 60 may be refilled through the hinged cover 68, as by insertion therein of blocks or bodies of polishing material, which may be spring-biased toward the open dispenser end.

At the forward end of movement of carriage 15, limit switch 79 is actuated to effect the stoppage of drive motor 31, thus to preclude any possibility of the further continued forward travel of the carriage 15. The reversal of the motor 31 and its restarting is accomplished by means of cam timers contained in the timing mechanism 36, all as hereinafter described. Additional polishing of the shoe is effected by the resulting rearward movement of the carriage 15. However, when the carirage has returned to its rearward position limit switch 78 is actuated to break the circuit to drive motor 31. After a predetermined number of the above-described forward-and-rearward cycles of movement of carriage 15, the carriage is halted.

The upper drive motor 56 is then actuated by the timing mechanism 36 and begins its back-and-forth swinging movement. A pair of limit switches 75 and 76 are actuated by plate 46, the latter serving as a cam, to effect reversal of the motor 56 through a number of cycles determined by the timing device 36. During this operation of motor 56, which effects swinging action of brush 54 and its shaft 53, the motor 47 is actuated by switch 90 to effect rotation of the brush about the axis of its shaft. Also, intermittent operation of polishing-material dispenser 71 may be effected by actuation of solenoid 72 in timed sequence, as desired. Thus, the brush 54 effects a swinging movement, and simultaneous rotation to efficiently polish and buff the top of the shoe 13.

After completion of a predetermined number of traverses of both the side brushes 30 and top brush 54, a pilot-light indicator 83 may be illuminated to indicate the end of the first cycle and placement of the other foot in the cabinet opening 12. Thereupon the push button switch 84 may be manually depressed and the above-described operation is repeated. The entire apparatus becomes reactivated for a second cycle, one cycle being required for each shoe. A pre-set timing device, initially actuated by the deposit of a coin, will serve to deactivate the entire system after the second polishing cycle. Reactivation of a new duo-polishing-buffing cycle may be initiated by insertion of another coin in the coin receiver 81.

The slide projector 73 may be of a conventional type, such as the Eastman Kodak "Carousel."

The actuating, moving and timing of the above-described operations are controlled and regulated by the timing mechanism 36, which is best described in FIGURE 12. Referring, therefore to FIGURE 12 and also to FIGS. 2–11 the electrical and timing system operates as follows:

Cams 104 through 111 are affixed to the shaft (not shown) of a motor 103. A coin deposited in the coin slot 81 will actuate the switch 101, thus completing the circuit to actuate the latch relay 102 which will complete circuits to actuate the cam drive motor 103, the projector 73 and the elapse timer motor 119.

The motor 103 will drive the cams 104–111, in a counterclockwise direction of rotation for a single revolution, which constitutes a single cycle of operation.

During each such revolution of the cams 104–111, the following will occur:

The switch arm 112 will deflect into the recess A of cam 111 thus completing the circuit 113 to limit switch 79. The switch 79, which is in a normally closed position, passes the current into circuit 114 for the forward drive of motor 31, thus activating the forward movement of the carriage 15. Such forward movement of the carriage 15 will cause the actuation of the limit switch 80, thus completing the circuit 133 to the motors 20, causing their operation and, therefore, the rotation of the brushes 30.

At the forwardmost position of the forward travel of the carriage 15, the switch guide 91, mounted on the carriage 15, will cause the limit switch 79 to be depressed, thus breaking the circuit 114 and causing a cessation of the forward drive of motor 31.

After a momentary pause, during which switch arm 112 will pass onto position C of cam 111, switch arm 120 will deflect into recess A of cam 110, thus closing the circuit 115 to limit switch 78. Switch 78, which is in a normally closed position, passes the current to circuit 116 for the reverse drive of motor 31, thus activating the rearward movement of the carriage 15.

Simultaneous with the reversing of the motor 31, switch arm 137 will deflect into the recess A of the cam 107, thus completing the circuit 117 and causing the energization of the solenoids 66 which actuate the feeding of the polishing material in the dispenser 60 to the brushes 30. At the rearwardmost position of the carriage 15, the switch guide 91 will cause the deflection of the limit switch 78, thus causing a break of the circuit 116 and a resultant stopping of the motor 31. The carriage 15 will thereupon be halted. Simultaneously therewith, the switch guide 92 mounted to the carriage 15 will cause the limit switch 80 to be depressed, thus causing a break in the circuit 133 and a resultant stopping of the motors 20.

The aforementioned forward movement of the carriage 15 will be repeated upon the switch arm 112, being deflected into the recess B of the cam 111. In analogous fashion, the rearward movement of the carriage 15 will be repeated when the switch arm 120 is deflected into the recess B of the cam 110.

At this point, the carriage 15 will remain halted. Thereupon, the switch arm 121 will deflect into the recess A of cam 109, thus completing the circuit to the limit switch 76. The switch 76 which is in a normally closed position, passes the current to the circuit 123, thus actuating the forward drive of the motor 56. A limit switch 90, mounted in close juxtaposition above plate 45, will thereupon be actuated, thus completing a circuit to the motor 47. The disc support 46, to which the motor 47 is attached, serves also as a cam and may be provided with indentations on its peripheral surface, as shown in FIGURES 10 and 11, thus to cause the actuation of the switch 76 and a break of the circuit 123 with a resultant stopping of the motor 56.

At this point, switch arm 124 will be deflected ino the recess A of the cam 108, thus completing the circuit 125 to the limit switch 75. Switch 75, which is in a normally closed position, will pass the current to the circuit 126, thus causing a reversing of the motor 56. The driving of the motor 56 in its reversed direction will cause a rotation of its disc support 46 which in turn, and at a predetermined position, will actuate the limit switch 75, thus causing a break in the circuit 126 and a stopping of the motor 56.

The limit switch 90, which controls the "on" and "off" positions of the motor 47, is actuated by the indentations set into the peripheral edge of the disc support 45, best seen in FIGURE 11.

The solenoid 72 will be energized when the switch arm 128 is deflected into the recess A of the cam 104 and de-energized when it passes out of said recess.

The coil 130 in the latch relays will be energized upon the switch arm 129 being deflected into the recess A of the cam 106, thus breaking the circuits.

The switch arm 135 will be deflected into the recess A of the cam 105, thus causing a stopping of the motor 103 and a break of the circuit 118 with a resultant de-energization of the projector.

The pilot light will thereupon become energized indicating the placement of the next shoe to be placed in the shoe support 14.

Circuit 129 to a counter 136 and 131 to a momentary switch 84 are thereupon actuated.

Upon the placing of the second shoe on the support 14, and at the operator's discretion, the momentary switch 84 may be depressed, thus causing the entire cycle, as aforementioned, to be repeated.

Upon completion of this second cycle of operation, a pre-set elapse timer 119 causes a momentary break of the circuit 132, thus shutting off the entire timing mechanism 36, and the machine.

The machine may be again re-activated by the insertion of another coin into the coin slot 81.

As switch 139 may be provided to shut down all operation of the machine.

It is to be noted that the cams 104 through 111 may be provided with a varying number of recesses depending upon the number of traverses desired in any polishing-buffing cycle. Further, the arcuate length of any recess may be varied depending upon the length of time required for any single traverse. In addition, the cams may be set so as to provide for any desired sequence of operation and/or for over-lapping or simultaneous operation of any two or more functions. This may be best illustrated by one embodiment of this invention wherein recess A of cam 111 will provide for the forward movement of the carriage 15, then recess A of cam 110 will provide for its rearward movement. Simultaneous with the rearward movement of carriage 15 as caused by the cam 110, the recess A of cam 107 will cause the operation of the solenoids 66 so as to cause the feeding of polish to the brushes 30. Thus, the first rearward traverse may be set for the application of polishing material. Subsequently, recess B of cam 111 will be in position to provide for the second forward movement of carriage 15. This will be followed by the second rearward movement caused by recess B of cam 110.

At the conclusion of the cycle of the carriage 15, the cams 109 and 108 will cause, in analogous fashion, the arcuate movement, back and forth, of the top brush 54. The recess A of the cam 104 is so aligned as to cause the application of the polishing material during the first traverse of the upper brush 54, as caused by the recess A of cam 109. Both cams 104 and 107 could be provided with additional recesses so as to provide for the application of polishing material during two or more traverses. Further, the cams 104 and 107 could be realigned so as to vary the time during which polishing material is applied.

The recess A in cam 106 is so positioned as to cause the energization of the coil 130 after the conclusion of the polishing and buffing cycle regulated by the cams 104, 107 through 111. Finally, the recess A of the cam 105 is so positioned as to effect the stopping of the cam motor at the final conclusion of the cycle.

From the foregoing it is seen that the present invention provides a shoeshining apparatus which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. An automatic shoeshine device comprising a support for placement of a shoe, a pair of side brushes on opposite sides of said support, side-brush mounting means mounting each of said side brushes for simultaneous rotation and reciprocatory movement along said support for engagement with respective sides of a shoe, a top brush spaced over said support, top-brush mounting means mounting said top brush for simultaneous rotation and oscillatory movement across said support for engagement with the top of a shoe, said side and top brushes being symmetrical for continuous rotation in engagement with a shoe, a polish dispenser adjacent to each of said brushes, and dispenser-mounting means mounting each dispenser for movement toward and away from the adjacent brush to control the rate of dispensing polish to the adjacent brush.

2. An automatic shoeshine device according to claim 1, said side and top brushes being generally cylindrical and said dispensers each comprising a housing having one end open and facing toward the adjacent brush, and porous retaining means over the open housing end for retaining a body of polishing material while dispensing the material through said retaining means to said adjacent brush.

3. An automatic shoeshine device according to claim 1, in combination with additional side-brush mounting means mounting said side brushes for resilient lateral movement toward and away from said support during said rotation and reciprocatory movement and drive means for rotating said side brushes and effecting said reciprocatory and oscillatory brush movement.

4. An automatic shoeshine device according to claim 1, in combination with automatic visual-display means located for viewing by a wearer of a shoe being shined, and control means for said display means to operate the latter when said brushes are moving.

References Cited

UNITED STATES PATENTS

| 1,076,035 | 10/1913 | Heller | 15—32 |
| 1,088,563 | 2/1914 | Grafton | 15—32 |
| 1,304,447 | 5/1919 | Bozzola | 15—34 |
| 1,448,342 | 3/1923 | Harris | 15—31 |
| 1,535,738 | 4/1925 | Raysor | 15—32 |
| 1,623,218 | 4/1927 | Thompson | 15—32 |
| 2,150,837 | 3/1939 | Magnuson | 15—31 |

CHARLES A. WILLMUTH, *Primary Examiner.*

EDWARD L. ROBERTS, *Examiner.*